United States Patent
Barlerin et al.

(10) Patent No.: US 7,938,582 B2
(45) Date of Patent: May 10, 2011

(54) SELF-LUBRICATING GUIDING MEMBER

(75) Inventors: Jean-Claude Barlerin, Saint-Just-Saint-Rambert (FR); Eric Chaduiron, Viricelles (FR)

(73) Assignee: H.E.F., Andrezieux Boutheon (FR)

( * ) Notice: Subject to any disclaimer, the term of this patent is extended or adjusted under 35 U.S.C. 154(b) by 830 days.

(21) Appl. No.: 11/816,690

(22) PCT Filed: Feb. 20, 2006

(86) PCT No.: PCT/FR2006/050146
§ 371 (c)(1),
(2), (4) Date: Aug. 20, 2007

(87) PCT Pub. No.: WO2006/087498
PCT Pub. Date: Aug. 24, 2006

(65) Prior Publication Data
US 2008/0152271 A1 Jun. 26, 2008

(30) Foreign Application Priority Data
Feb. 21, 2005 (FR) ..................... 05 50474

(51) Int. Cl.
*F16C 33/10* (2006.01)
(52) U.S. Cl. ....................... 384/292; 384/276
(58) Field of Classification Search ........... 384/206, 384/208, 213, 276, 280, 282–286, 288–294
See application file for complete search history.

(56) References Cited

U.S. PATENT DOCUMENTS

| | | | | | |
|---|---|---|---|---|---|
| 1,153,647 | A | * | 9/1915 | Smalley | 384/283 |
| 1,299,799 | A | * | 4/1919 | Smalley | 384/283 |
| 1,637,317 | A | * | 7/1927 | Shoemaker | 384/284 |
| 4,576,488 | A | | 3/1986 | Steiner et al. | |
| 4,678,348 | A | | 7/1987 | Tielemans et al. | |
| 5,247,873 | A | * | 9/1993 | Owens et al. | 92/157 |
| 5,516,213 | A | * | 5/1996 | Moriyama et al. | 384/292 |
| 6,626,577 | B1 | * | 9/2003 | Horng et al. | 384/292 |
| 2003/0190101 | A1 | | 10/2003 | Horng et al. | |
| 2004/0042698 | A1 | * | 3/2004 | Yamamoto et al. | 384/291 |
| 2006/0257059 | A1 | * | 11/2006 | Kubota et al. | 384/293 |

FOREIGN PATENT DOCUMENTS

| | | |
|---|---|---|
| FR | 1 019 801 | 1/1953 |
| FR | 2 523 010 | 9/1983 |
| FR | 2 693 520 | 1/1994 |

OTHER PUBLICATIONS

International Search Report; PCT/FR2006/050146; Jun. 12, 2006.

* cited by examiner

*Primary Examiner* — James Pilkington
(74) *Attorney, Agent, or Firm* — Heslin Rothenberg Farley & Mesiti P.C.

(57) ABSTRACT

A self-lubricating guiding element which is characterized in that the body thereof is made from a material with high resistance to wear and/or seizing and corrosion. Each of the ends of the bore in the body is equipped with at least one groove which is intended to prevent the lubricant from leaving the friction zone. In addition, the bore comprises oriented slots, at least between the grooves, which open into at least one of the grooves and which are used to store lubricant.

8 Claims, 3 Drawing Sheets

SELF-LUBRICATING GUIDING MEMBER

CROSS REFERENCE TO RELATED APPLICATIONS

This application is a Section 371 filing of International Application No. PCT/FR06/50146 filed on Feb. 20, 2006 and published in French as International Publication WO 2006/087498 A1 published on Aug. 24, 2006, and claims priority of French Application 0550474 filed on Feb. 21, 2005, the entire contents of these applications being hereby incorporated by reference herein.

BACKGROUND OF THE INVENTION

The invention relates to a self-lubricating guide member for joints or bearings.

More particularly, the invention finds an advantageous application in the case of joints or bearings operating in difficult conditions and environments, being highly loaded and operating in abrasive, and possibly corrosive atmospheres.

These types of joints and bearings may be found in numerous technical fields, among which mention can be made, for information and in a non-limiting manner, of public works, steelmaking, farm machinery, transport vehicles, etc. More generally, the joints concerned by the invention operate exclusively under high loads with pivoting low speed movements and are previously greased. These operating conditions can in no case create a hydrodynamic regime, as is the case of the teaching of U.S. Pat. No. 4,678,348 and U.S. Pat. No. 4,576,488. The invention therefore applies to joints operating in oily lubricating conditions.

Due to the field of application, these joints or bearings must in particular have excellent friction and wear behaviour characteristics, having been greased exclusively upon assembly and/or with very long lubrication frequencies.

Various technical alternatives have been proposed to constitute grease reserves on the friction surface.

For example, patent FR 2 523 010 discloses a joint ring whereof the bore is knurled, to act as a lubricant reserve, particularly for grease.

In patent FR 2 693 520, the bore of the ring or guide member is equipped with a liner where a pin pivots in contact with a bearing face of the liner. This liner may consist of a strip rolled perpendicular to its length and hooped in the bore of the ring.

These arrangements serve particularly to increase the resistance to abrasive wear and to jamming, which is often high due to the applications considered. The lubrication takes place upon assembly or periodically at long intervals.

With this type of ring, regardless of its embodiment, particularly with regard to its bore which constitutes the friction surface, with or without arrangements suitable for acting as a grease reserve, serious problems must be solved to guarantee permanent or virtually permanent lubrication, in consequence, preventing the grease or other lubricant from escaping.

Based on this prior art, the problem that the invention proposes to solve is to constitute a grease reserve in the friction zone, not only preventing the grease or other lubricant from escaping but, on the contrary, permitting the resupply of the lubricant to the said friction zone.

BRIEF SUMMARY OF THE INVENTION

To solve such a problem, a self-lubricating guide member has been designed and developed in the form of a body having a bore for mounting an element with friction and articulation and/or sliding capacity. The body is made from a material having high wear and/or jamming and corrosion resistance, each of the ends of the bore has at least one channel suitable for preventing the lubricant from leaving the friction zone, the said bore having, at least between the said channels, oriented grooves terminating in at least one of the channels and suitable for acting as a lubricant reserve.

Advantageously, this provides the possibility of decreasing the lubrication frequencies, since the lubricant remains in the friction zone, and does not tend to escape due particularly to the communication of the grooves with the channels.

To solve the problem of constituting a lubricant reserve in communication with the retaining channels, the grooves may have various embodiments.

Advantageously, the grooves are oriented to form a grid.

In view of the problem to be solved, the depth of the channels is about 1 to 10 times higher than the depth of the grooves.

Furthermore, it has appeared advantageous for the depth of the channels to be at least equal substantially to one-third of the thickness of the body.

Advantageously, the grooves bound a zone representing about 30 to 70% of the friction zone.

It has also appeared advantageous for the channels to be positioned between 1 and about 6 mm from each of the ends of the bore. The width of the channels is between 0.5 and about 5 mm.

BRIEF DESCRIPTION OF THE DRAWING FIGURES

The invention is described in greater detail below with the help of the figures appended hereto in which.

DETAILED DESCRIPTION

Figure 1:
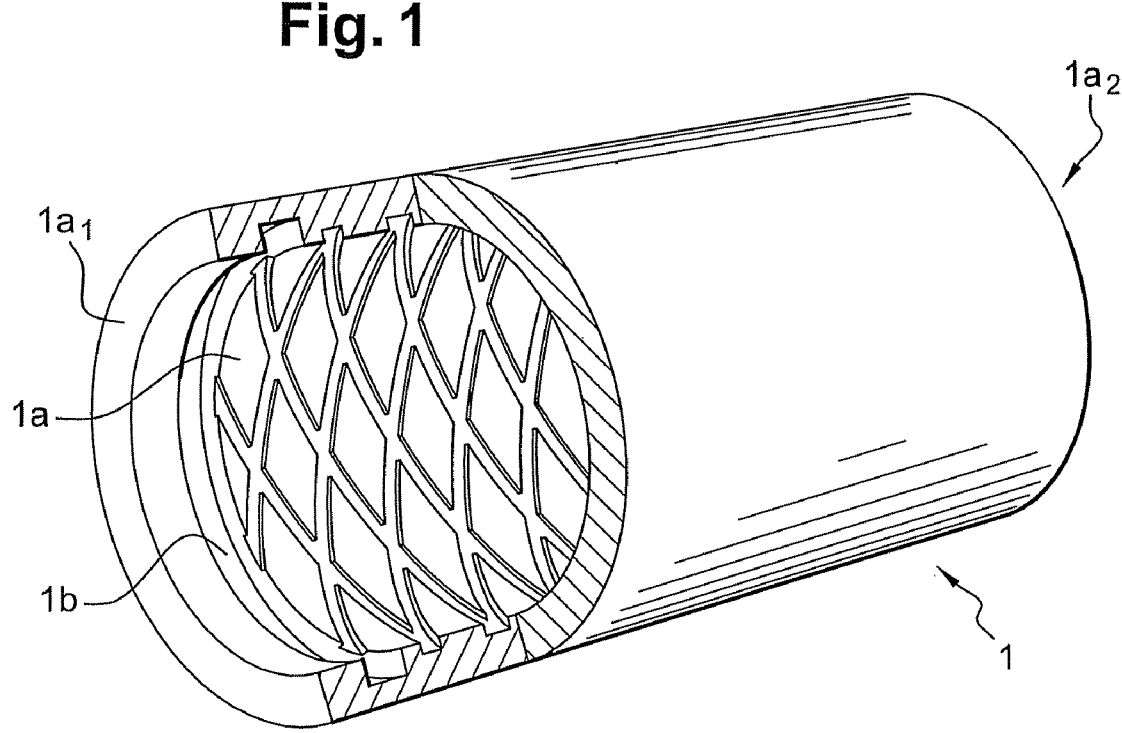
FIG. 1 is a perspective view with partial cross section of one embodiment of a ring for joints or bearings according to the invention.

FIG. 1 shows an exemplary embodiment of a guide member in the form of a cylindrical body (1) having a coaxial bore (1a) for friction mounting of a pin (2) in combination with grease or other lubricant. Generally, the cylindrical body (1) is made from any type of material having high wear and/or jamming and corrosion resistance, in extreme operating conditions, particularly in case of high pressure, corrosion and abrasion. The cylindrical body (1), particularly its bore (1a), may be subjected to any type of surface treatment.

As it appears from the rest of the description, in the context of the present invention, guide member refers, for example, to bearings, slides, ball-and-socket joints, etc.

According to the invention, each of the ends (1a1) and (1a2) of the bore (1a), has at least one channel (1b) and (1c) suitable for preventing the grease or other lubricant from leaving the friction surface. For information and in a non-limiting manner, the depth of the channels (1b) and (1c) may be between 0.3 and about 3 mm. More generally, the depth of the channels (1b) and (1c) is, at most, equal to substantially one-third of the thickness of the body (1).

Figure 4:
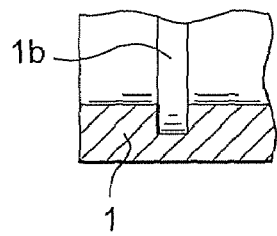
FIGS. 4, 5, 6 and 7 are partial cross sections showing, as examples, various channel root profiles.
Figure 5:
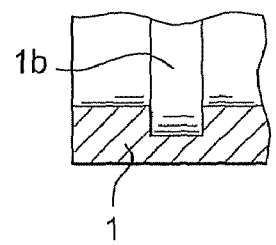
Figure 6:
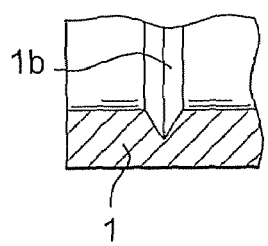
Figure 7:
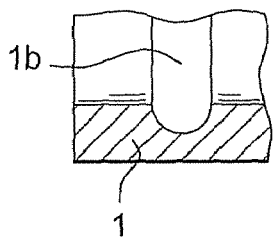

The profile of the channels may have various shapes, particularly and in a non-limiting manner, square (FIG. 4), rectangular (FIG. 5), triangular (FIG. 6), round (FIG. 7), being bevelled or not.

In view of the problem to be solved, to prevent the grease from leaving the friction surface, the channels (1b) and (1) are positioned at a distance (x) from each of the ends (1a1) and (1a2) of the bore. This distance is between 1 and about 6 mm. Similarly, the width of the channels (1b) and (1c) is between 0.5 and about 5 mm.

According to an important feature of the invention, the bore (1a) has, at least between the channels (1b) and (1c), grooves (1d) suitably oriented and terminating in at least one of the said channels (1b) and (1c), the said grooves acting as a lubricant reserve. The depth of the grooves maybe between 0.1 to about 0.6 mm.

Figure 10:
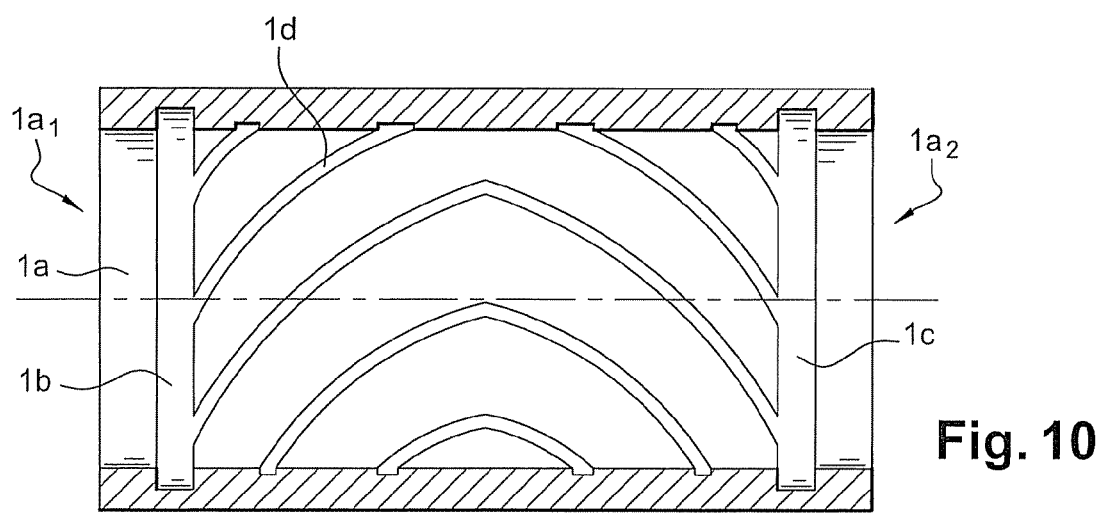
FIG. 10 is a longitudinal cross section of a ring according to another embodiment of the grooves.

For example, as shown in FIG. 10, these grooves (1d) can be oriented in order to form chevrons. These chevrons may be joined at their apex, as is the case in the example shown. Without exceeding the scope of the invention, it is unnecessary for the chevrons to be joined at their apex.

Figure 2:
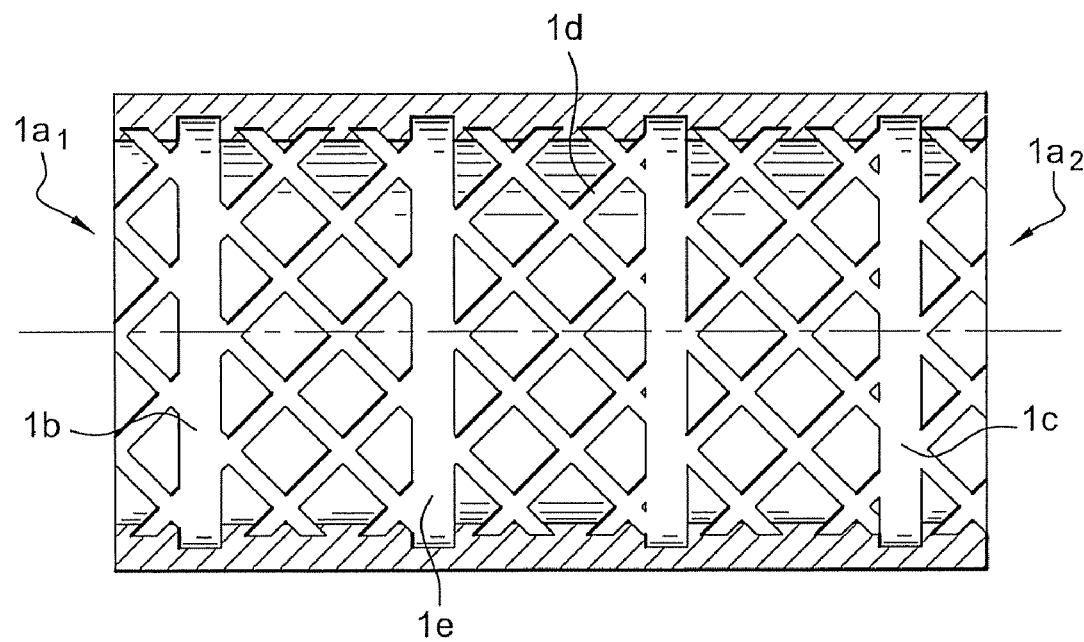
FIG. 2 is a longitudinal cross section of a ring, according to a preferred embodiment.
Figure 3:
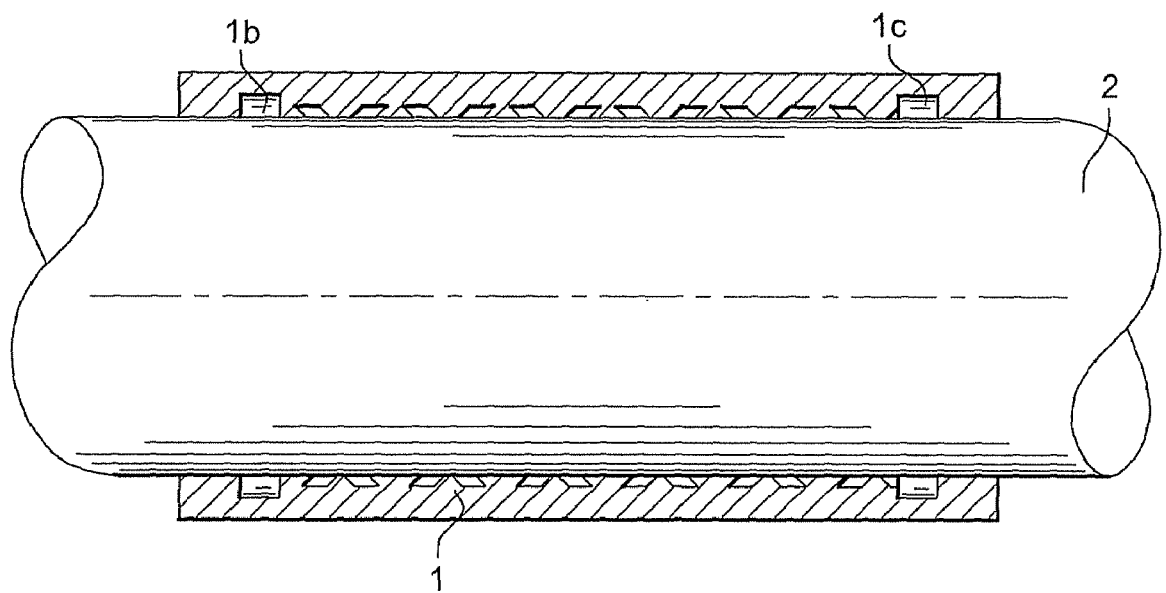
FIG. 3 is a view corresponding to FIG. 2 after mounting of a pin.

In the embodiment shown in FIG. 2, which is considered as particularly advantageous, the grooves (1d) are oriented to form a grid.

In view of the combination of channels (1b) and (1c) and grooves (1d), it results that the said channels in communication with the said grooves serve to prevent the removal of the lubricant present in the zone bounded by the said grooves (1d).

Advantageously, the bore (1a) of the body (1) has channels (1e) distributed along the whole of its length in order to facilitate the resupply of the grooves (1d) with grease or other lubricant. Thus, the channels (1b), (1c), (1e) are distributed on the whole length of the body with a space (e) whereby:

$$p \leq e \leq 6p$$

where:
p=pitch between the grooves;
e=spacing between the channels.

Similarly, the number of channels (1b), (1c), (1e) is distributed on the whole length of the body and corresponds to the formula:

$$\frac{0.1\ L}{1} \leq n \leq \frac{0.25\ L}{1}$$

where:
n=number of channels;
L=length of the body;
l=width of the channels.

The depth of the channels (1b) and (1c) is about 1 to 10 times higher than the depth of the grooves (1d). The grooves (1d) bound a zone (chevrons or grid, for example) representing about 30 to 70% of the friction zone.

As an indicative example, a ring may have the following characteristics for the channels and grooves in the form of a grid:
Channels:
Depth: about 1.5 mm;
Width: about 2 mm;
Edge distance: 1.5 mm to 2 mm;

Number:

$$\frac{0.1\ L}{1} \leq n \leq \frac{0.25\ L}{1};$$

Spacing: 8 to 12 mm.
Grooves (grid)
Pitch: 4 to 6 mm;
Depth: 0.3 mm;
Angle: 30° to 35.

Figure 8:
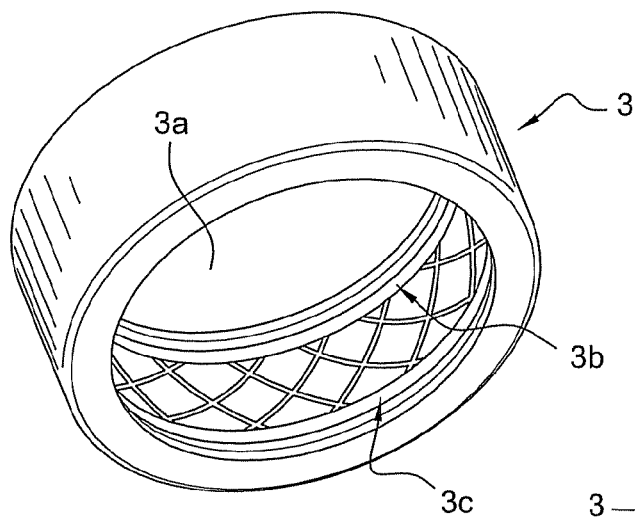
FIG. 8 is a perspective view of a ring according to the invention for a ball-and-socket joint.
Figure 9:
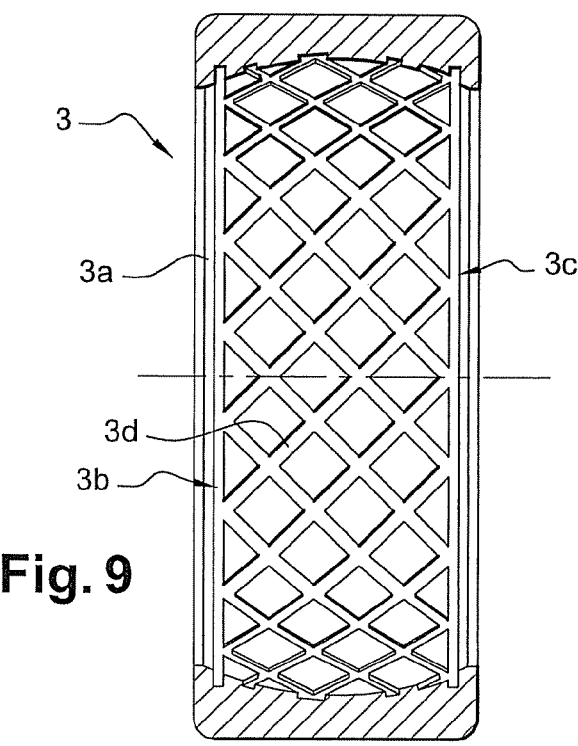
FIG. 9 is a longitudinal cross section corresponding to FIG. 8.

This type of ring finds many applications among which, for information and in a non-limiting manner, mention can be made of:
public works equipment (hydraulic shovel, loaders, crushers, etc.);
farm equipment (front axles of tractors, ploughs, telescopic loaders, bush pillers, etc.);
steel manufacture (conveyor rollers, bearings, etc.);
materials handling loaders, etc.;

The invention also applies to slides and ball-and-socket joints and, in general, to any type of joint. FIGS. 8 and 9 show an exemplary embodiment of a ring (3) for a ball-and-socket joint. The cage (3a) of the ring intended to receive the head of the ball-and-socket joint not shown) has, at each of its ends, a channel (3b) and (3c) to channel and retain the grease, as indicated above.

Between the channels (3b) and (3c), grooves (3d) are formed in the form of a grid or chevrons for example, communicating with the said channels.

The results of tests conducted confidentially are reported below, in the case of an application to a plain bearing without grease reserve and to a bearing with grease reserve, on the one hand according to the prior art, and on the other, according to the invention.

Example 1

Self-lubricating guide member according to the prior art, that is, without circular channels, but with only grooves, in the form of a grid, distributed on the surface of the bearing to act as a grease reserve.
Shaft material: 16NiCr6 case hardened steel
Type of bearing: grid mounted bearing (with grease reserve with anti-wear and anti-jamming surface treatment)
Shaft diameter: 30 mm
Length of guide member: l=20 mm
Movement: alternating 90° rotation at 1 Hz frequency
Pressure calculated on projected area: 50 Mpa
Sliding speed: 8 mm/s
Extreme pressure grease: with lithium soap, type SNR-LUB EP, grade NLGI 2
Factory greased, then operation without addition of grease.
Test results: Number of oscillations before rapid increase in friction coefficient: 138,000

Example 2

Self-lubricating guide member according to the invention.
Example 1 is reproduced, except that the guide member has two circular channels 2 mm wide and 2 mm deep located at a distance of 1 mm from the ends of the bearing, with grooves being formed between the channels in a grid, and communicating with the said channels.
Test results: Number of oscillations before rapid increase in the friction coefficient>500,000 (tests stopped before the end).

The advantages clearly appear from the description, and it is emphasized that the channels prevent the expulsion of the grease, while the grooves serve to distribute the said grease in the friction zone.

The invention claimed is:

1. A self-lubricating pre-greased guide member operating in oily conditions, comprising a body having a bore for mounting an element with friction and articulation and/or sliding capacity, wherein the body is made from a material having wear and/or jamming and corrosion resistance, ends of the bore having respective end channels preventing grease from leaving a friction zone of the guide member, the bore having, at least between the end channels, oriented grooves terminating in at least one of the end channels, the oriented grooves acting as a grease reserve, and additional channels to supply the grease to the grooves, the end channels and the additional channels having a depth greater than a depth of the grooves, and being distributed along a whole length of the body with a spacing in accordance with:

$$p \leq e \leq 6p$$

where:
p=pitch between the grooves;
e=spacing between the channels.

2. The self-lubricating pre-greased guide member according to claim 1, wherein the grooves are oriented to form a grid.

3. The self-lubricating pre-greased guide member according to claim 1, wherein the depth of the end channels is 1 to 10 times greater than the depth of the grooves.

4. The self-lubricating pre-greased guide member according to claim 1, wherein the depth of the channels is, at most, equal to substantially one-third of a thickness of the body; and width of the end channels is between 0.5 and 5 mm.

5. The self-lubricating pre-greased guide member according to claim 1, wherein the depth of the grooves is between 0.1 and about 0.6 mm.

6. The self-lubricating pre-greased guide member according to claim 1, wherein the grooves bound a zone representing 30 to 70% of the friction zone.

7. The self-lubricating pre-greased guide member according to claim 1, wherein the end channels are positioned between 1 and 6 mm from each of the ends of the bore.

8. The self-lubricating pre-greased guide member according to claim 1, wherein the number of end channels and additional channels corresponds to the formula:

$$\frac{0.1\, L}{1} \leq n \leq \frac{0.25\, L}{1}$$

where:
n=number of channels;
L=length of the body;
l=width of the channels.

* * * * *